United States Patent
Martin et al.

(10) Patent No.: US 8,627,406 B2
(45) Date of Patent: Jan. 7, 2014

(54) DEVICE FOR PROTECTION OF THE DATA AND EXECUTABLE CODES OF A COMPUTER SYSTEM

(75) Inventors: René Martin, Bures sur Yvette (FR); Alain Filée, Conflans Sainte Honorine (FR)

(73) Assignee: Bull S.A.S, Les Clayes sous Bois (FR)

( * ) Notice: Subject to any disclaimer, the term of this patent is extended or adjusted under 35 U.S.C. 154(b) by 1624 days.

(21) Appl. No.: 11/831,528

(22) Filed: Jul. 31, 2007

(65) Prior Publication Data
US 2009/0037730 A1    Feb. 5, 2009

(51) Int. Cl.
*G06F 21/00*    (2013.01)

(52) U.S. Cl.
USPC ............ 726/2; 726/18; 726/28; 713/159; 713/186; 713/193; 709/227; 455/411; 705/54; 380/30

(58) Field of Classification Search
USPC ........................... 713/151, 168; 726/2
See application file for complete search history.

(56) References Cited

U.S. PATENT DOCUMENTS

| | | | |
|---|---|---|---|
| 4,467,139 A | | 8/1984 | Mollier |
| 4,544,833 A | | 10/1985 | Ugon |
| 4,907,270 A | | 3/1990 | Hazard |
| 4,910,773 A | | 3/1990 | Hazard et al. |
| 5,859,966 A | * | 1/1999 | Hayman et al. ............ 726/23 |
| 6,694,436 B1 | * | 2/2004 | Audebert ............ 726/9 |
| 6,735,693 B1 | * | 5/2004 | Hamlin ............ 713/168 |
| 6,978,381 B1 | * | 12/2005 | Te et al. ............ 726/18 |
| 7,089,595 B1 | * | 8/2006 | Grawrock ............ 726/36 |
| 2003/0163798 A1 | * | 8/2003 | Hwang et al. ............ 716/16 |
| 2004/0054914 A1 | * | 3/2004 | Sullivan ............ 713/189 |
| 2004/0228479 A1 | * | 11/2004 | Crispin et al. ............ 380/28 |
| 2006/0059368 A1 | * | 3/2006 | Fayad et al. ............ 713/189 |
| 2006/0107036 A1 | * | 5/2006 | Randle et al. ............ 713/153 |
| 2006/0242428 A1 | * | 10/2006 | Tarkkala ............ 713/189 |
| 2007/0028292 A1 | * | 2/2007 | Kabzinski et al. ............ 726/2 |
| 2007/0174616 A1 | * | 7/2007 | Buer ............ 713/168 |
| 2007/0226518 A1 | * | 9/2007 | Yasaki et al. ............ 713/189 |
| 2008/0040615 A1 | * | 2/2008 | Carper et al. ............ 713/186 |
| 2008/0063183 A1 | * | 3/2008 | Greco et al. ............ 380/2 |
| 2008/0065905 A1 | * | 3/2008 | Salessi ............ 713/193 |
| 2008/0077993 A1 | * | 3/2008 | Zimmer et al. ............ 726/27 |
| 2008/0104348 A1 | * | 5/2008 | Kabzinski et al. ............ 711/164 |
| 2008/0109662 A1 | * | 5/2008 | Natarajan et al. ............ 713/193 |

FOREIGN PATENT DOCUMENTS

| | | |
|---|---|---|
| EP | 0 037 762 | 3/1981 |
| EP | 0 252 850 | 7/1987 |
| EP | 0 285 520 | 4/1988 |
| FR | 2 526 977 | 5/1982 |

* cited by examiner

*Primary Examiner* — Morshed Mehedi
(74) *Attorney, Agent, or Firm* — Miles & Stockbridge P.C.

(57) ABSTRACT

A security and protection device (1) for protection of the data and executable codes of any fixed or portable computer system and that has a memory medium to be protected. The security and protection device (1) is located physically between the computer system (2) and the memory medium (MP) to be protected, in order to allow the computer system (2) access to the data and codes to be protected after execution of the protection functions independently of the machine code executed by the computer system (2) and requires no interaction with the processor of the system for the execution of these functions.

31 Claims, 2 Drawing Sheets

DEVICE FOR PROTECTION OF THE DATA AND EXECUTABLE CODES OF A COMPUTER SYSTEM

TECHNICAL FIELD OF THE INVENTION

This present invention concerns a device for protection of the data and executable codes of a computer system.

TECHNOLOGICAL BACKGROUND OF THE INVENTION

One is familiar with systems used for the protection of data, and in particular, for example, the protection of transmitted data, and for performing authentication, in a reliable manner, of the person who has transmitted a message. Such a device is known through patent application EP 0 037 762 for example. However, such a device required a signature calculation to be performed in a portable object of the chip card type, then comparing the result of the calculation effected with the signature transmitted with the message, in order to then deliver to the outside world a "yes" or "no" result allowing authentication of the person who transmitted the message as the person who was in possession of a chip card whose confidential codes matched the confidential codes of the device that performed the authentication.

We are also familiar, from French patent application FR 2 526 977, with a device that allows authentication or certification of at least one information item contained in a memory of an electronic medium. Such a device and process employs a chip card, and can be used to calculate a result from knowledge of the data item stored in the electronic medium and of a parameter correlative to the position of the data item in the memory of the support. The same calculation is effected at the other end of the transmission by the device that transmitted the information, and the result supplied by one of the ends is compared in order to ensure that the registration has been completed correctly in the memory of a portable electronic medium such as the card.

Such a device conducts remote communication between a terminal equipped with a security module and a chip card in which one wishes to record an information item sent by this terminal. This takes no account of the problems of security at the level of the computer system of the terminal itself, and the certification and the authentication of the data recorded in the memory of the terminal.

We are also familiar, from patent application EP 0 285 520, with a process and a device for routing the confidential codes between two security modules connected by a communication resource. This routing of confidential codes allows one to ensure the confidentiality of these keys by transmitting the keys in an encrypted manner.

Finally, we are also familiar, from patent application EP 0 252 850, with a process and a device to certify the authenticity of a data item transmitted between two devices connected locally or remotely over a transmission line. The device and the process add, to the information to be transmitted, a predetermined condition that is independently of the value of the data item to be transmitted. This predetermined condition, together with the information to be transmitted, constitutes the message that is encrypted before transmission, and then decrypted on reception. After decryption, the receiver separates the received message into two fields and applies the same predetermined condition to one of the two fields, and if this predetermined condition is satisfied, the system considers that the transmission has taken place correctly.

However, most of the devices of the prior art have as their objective either to secure transmitted data from one terminal to another, or to authenticate a transmitter in relation to a receiver, or to allow access to a service by authenticating a person as being authorised to have access to the service.

GENERAL DESCRIPTION OF THE INVENTION

The objective of the invention, contrary to that of the prior art, is to protect the data and the executable codes of a computer system by using one or more of the following functions for authenticating the integrity of the codes and the data, and to maintain the confidentiality of the codes and the data.

This objective is attained by the fact that the device for protection of the data and executable codes of any fixed or portable computer system and with a memory medium to be protected is characterised in that the security and protection device is located physically between the computer system and the memory medium to be protected and containing the data and executable codes, in order to provide the computer system with access to the data and codes to be protected after execution of the protection functions independently of the machine code executed by the protected computer system and, for the execution of these functions, requires no interaction with the processor of the system.

According to another particular feature, the proposed protection functions concern the authorisation of access, and the integrity and the confidentiality of the data and codes to be protected.

According to another particular feature, the data and codes are stored either on a fixed medium (of the RAM or flash memory type for example) or on a removable medium (hard disk, USB key, etc.).

According to another particular feature, the memory medium can be logically partitioned into several independent partitions which are seen as so many physical partitions by the system.

According to another particular feature, the operating system of the device has two operating modes that are independent and not simultaneous, namely an administrator mode and a user mode.

According to another particular feature, the operating system of the device runs the process for activation of the device at the time of its connection to the system when it is switched on.

According to another particular feature, the activation process necessitates the authentication of the user or of the administrator.

According to another particular feature, the operating system of the device implements protection functions independently of the machine code executed by the protected computer system.

According to another particular feature, the protection functions are independent of those of the protected computer system and require no interaction with the protected computer system.

According to another particular feature, the interfaces with the memory medium and the computer system are of the parallel type (processor bus, PCMCIA bus, etc.) or the serial type (USB, PCI-X, etc.) or the wireless type (USB wireless).

According to another particular feature, the user mode exclusively allows access to the data and codes.

According to another particular feature, the administrator mode exclusively allows configuration (in particular the size of the authentication data, cryptographic mechanisms employed, the number of partitions and attributes, and diverse user authorisations) and managing the device.

According to another particular feature, the authentication of the administrator is effected by the device itself by means of interface resources between the administrator and the device that are invisible to the computer system.

According to another particular feature, the authentication of the user is effected by the operating system of the device itself using resources that are invisible to the computer system.

According to another particular feature, the authentication data are either generated entirely by the device or generated partly by the device and partly by the user (or the administrator). In the first case the device generates the authentication data and presents these to the user on a display unit built into the device. In the second case, the device generates an authentication code partly from data within the device and the remainder from data entered by the user directly on the device.

According to another particular feature, the authentication data are unique to each device.

According to another particular feature the authentication data are not stored in the device when it is switched on. For this, the device stores only a part of the data that has been used by the hashing function that generated the authentication data. The reconstruction of the authentication data therefore necessarily requires the entry of the missing data by the user.

According to another particular feature, the authentication of the user is followed by the selection by the user of the partition or partitions that can be accessed by the computer system.

According to another particular feature, the accessible partitions can be configured in number, size and method of access (read only, read/write) by an administrator, and on which checks are performed by cryptographic mechanisms executed by the device independently of the computer system.

According to another particular feature, the right of the user to change the configuration of the partitions can also be configured by an administrator.

According to another particular feature, access to the authorised partitions is effected by the security operating system and the processor of the security device itself, independently of the system.

According to another particular feature, the protected memory constituting the storage system can be formatted to suit the operating system of the computer system to be protected while being impossible to operate until after prior authentication of the user by the device.

According to another particular feature, the authorised partitions can contain any type of code that is executable by the computer system to be protected (any type of operating system, any type of application, etc.) and any type of data in the form of any file system.

According to another particular feature, the generation of the integrity patterns and checks on the integrity of the codes read or written by the computer system is effected by the device itself, independently of the computer system.

According to another particular feature, the generation of the integrity patterns and checks on the integrity of the data read or written by the computer system is effected by the device itself, independently of the computer system.

According to another particular feature, managing the integrity of the data consists of the implementation by the device itself of cryptographic mechanisms between the memory medium to be protected and the computer system.

According to another particular feature, managing the integrity of the codes consists of the implementation by the device itself of mechanisms of cryptographic signature type between the memory medium to be protected and the computer system.

According to another particular feature, any detection by the device of a fraudulent or unexpected change to the data or the codes inhibits access by the system to the changed data or codes.

According to another particular feature, protection of the confidentiality of the data or the codes read or written by the system is effected by the device itself, independently of the computer system.

According to another particular feature, managing the confidentiality of the data or the codes consists of the execution of a cryptographic encryption mechanism.

According to another particular feature, no cryptographic key used is stored in clear in any of the memories of the computer system.

According to another particular feature, no cryptographic key is transmitted in clear on any of the external busses of the system incorporating the device.

According to another particular feature, the operating system of the device includes mechanisms that allow the secure transmission, in terms of integrity and/or confidentiality, from a central system, of a secured update of the code executed on the target systems or of the data manipulated on the target systems.

BRIEF DESCRIPTIONS OF THE DRAWINGS

Other particular features and advantages of this present invention will appear more clearly on reading the description that follows, which is provided with reference to the appended drawings representing a non-limiting embodiment of the invention, in which.

DESCRIPTION OF A PREFERRED EMBODIMENT OF THE INVENTION

In the remainder of this document, the terms authentication, integrity and confidentiality will have the following meanings.

Authentication: The purpose of authentication is to ensure that the codes to be executed and the data to be manipulated, contained in the device or protected by it, are made available to the appropriate physical person. This authentication must not be capable of being bypassed by any malicious person or system.

Integrity of the codes and the data: This integrity has as its objective to guarantee to the physical person that the codes and the data presented by the device are indeed those expected by the person concerned. This integrity must not be capable of being infringed by any malicious person or system.

Confidentiality of the codes and the data: This confidentiality has as its objective to ensure that the codes and data are accessible only when the device is in operation and when the physical person has been correctly authenticated. This confidentiality must not be capable of being infringed by any malicious person or system.

Figure 1:
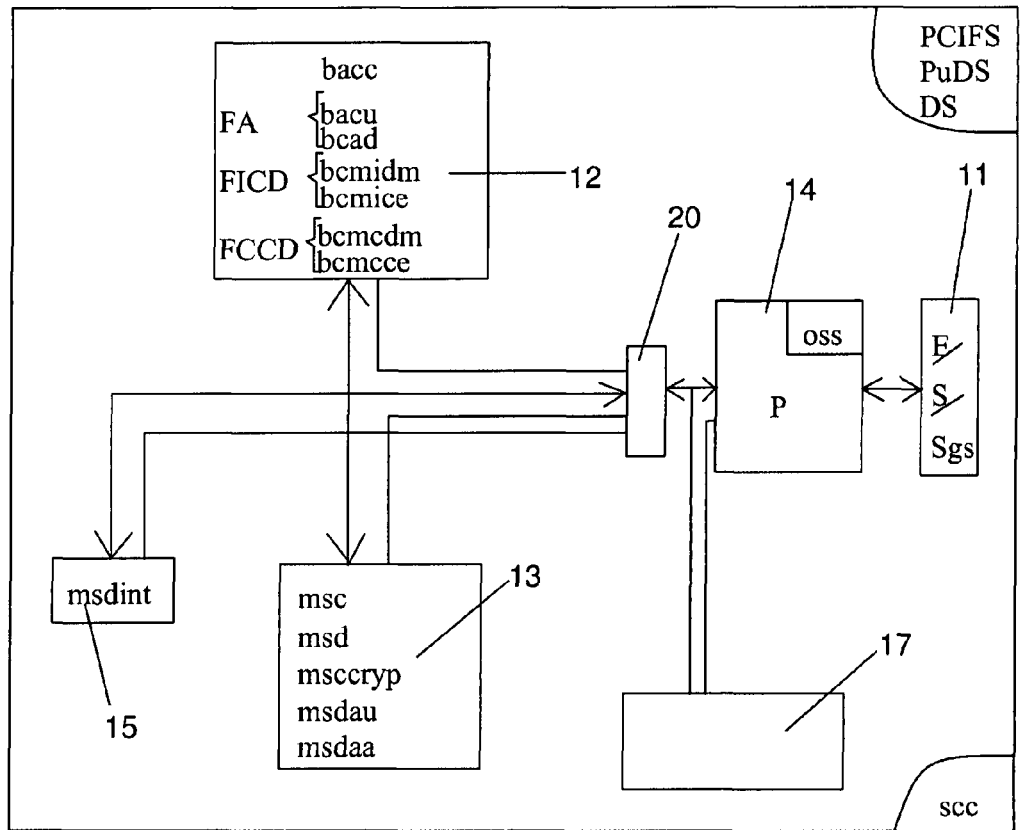
FIG. 1 represents either a integrated chip composed of either a partial integrated circuit with security function (PCIFS), or a security chip (PuDS), or a security device (DS) that includes a chip embedded in a block that guarantees its security against any violation.

In order to achieve all of the points mentioned, the invention first calls upon the creation of a special cryptographic component (1) in the form of a SOC (System On Chip). As illustrated in FIG. 1, this component (1) includes several cryptographic blocks shown with the reference 12, with the various blocks being as follows:

The cryptographic blocks used to implement the integrity mechanisms of the data manipulated (bcmidm) by the computer system and the cryptographic blocks used to implement the integrity mechanisms of the codes executed (bcmice) by the computer system. These two blocks are used to execute the integrity function of the codes and data (FICD)

The cryptographic blocks used to implement the confidentiality mechanisms of the data manipulated (bcmcdm) by the computer system and the cryptographic blocks used to implement the confidentiality mechanisms of the codes executed (bcmcce) by the computer system. These two blocks are used to execute the confidentiality function of the codes and data (FCCD)

The cryptographic blocks used to perform the authentication of the user (bcau) and the cryptographic blocks used to perform the authentication of the administrator (bcad). These two blocks are used to execute the authentication function (FA).

The cryptographic blocks ensuring the confidentiality of the system of cryptographic keys of the device.

The cryptographic blocks ensuring the integrity of the system of cryptographic keys of the device.

The algorithm blocks for generation of cryptographic keys (bacc).

This component also includes:

A processor (P) in synthesised form or in hardware running a security operating system (OSS) which, as required, calls upon the functions and blocks of the component, The internal memories that allow manipulation of the sensitive data.

The device also incorporates:

An Input/Output system (11) that is recognised by the computer system.

A medium (13) for storage of the data (msd).

A medium (13) for storage of the codes (msc).

A medium (13) for storage of the cryptographic keys (msccryp).

A medium (13) for storage of the data used to perform the authentication of the user (msdau).

A medium (13) for storage of the data used to perform the authentication of the administrator (msdaa). Authentication of the administrator is effected by the entry on the device of authentication data that enable the device to verify a cryptographic signature calculated during initialisation of the device.

A medium (14) for storage of the code executed (OSS) by the processor (P) of the security device.

A medium (15) for storage of the data, including storage of a cryptographic signature of the stored data that is used to verify the integrity (msdint) of the code executed by the device. Verification of integrity is effected by calculation of a cryptographic signature using the same cryptographic algorithm during reading of the data, and comparison with the stored signature.

A means of entry (17) that is independently of the computer system.

The interfaces (E/S/Sgs) (11) of the device with the memory medium (MP) and the system are of the parallel type (processor bus, PCMCIA, etc.) or of the serial type (USB, PCI-X, etc.) or of the wireless type (Wireless USB).

The media (13) for storage of the data and executable codes can be a fixed medium (of the RAM of flash memory type, for example) or a removable medium (hard disk, USB key, etc.).

The operation of this device will now be described in greater detail.

The activation process of the security device (1) is effected by the security operating system during its connection to the system (2) or when it is switched on.

During its operation, the operating system of the security device (1) implements two operating modes that are independent and not simultaneous, and for each of these necessitates authentication either of the user (user mode) or of the administrator for the creation mode of the user.

The first mode is therefore the administrator mode, whose authentication is generated by the cryptographic block (bcad).

The second mode is the user mode (cryptographic block bcau).

In the administrator mode, during the phase for configuration or initialisation of the device, it is possible to determine, in particular, the size of the authentication data, the cryptographic mechanisms employed, the number of partitions and attributes, the diverse authorisations for a user, and the generation of the data partly by the device and partly by the user (or the administrator) or entirely by the device. The right of the user to change the configuration of the partitions can also be configured by the administrator and all the elements resulting from the configuration will be stored for use by the security operating system (OSS) of the device.

During the initialisation phase of the device, at least one part of the cryptographic elements employed are brought to the knowledge of the user. These elements are specific to the user and to the administrator, and are also unique to each device. They must be supplied to the device which, from these elements, will be able to regenerate, by cryptographic mechanisms, of the diversification type for example, a system of keys that are used to perform the authentication of the user, independently of the computer system. A parameter indicating to the operating system of the device that the authentication data are either generated entirely by the device or generated partly by the device and partly by the user (or the administrator), is stored by the administrator during the initialisation phase.

During initialisation of the device, in the first case, the device generates the authentication data and presents a part of this to the user on a display unit built into the device. In the second case, the device generates the authentication data partly from data within the device and the remainder from data entered by the user directly on the device.

In order to render this authentication mechanism independent of the computer system (2) and specific to each device, the security device (1) will generate a system of keys that can be activated only by the making available by the user of cryptographic elements brought to the knowledge of the device during the phase for creation of the user in the device.

Once creation has been completed in administrator mode, the cryptographic block (12) is activated, and any use in user mode or in administrator mode necessitates a prior authentication. The authentication data are not stored in the device when it is switched on. For this, the device stores only a part of the data that has been used by the hashing function that generated the authentication data. Reconstruction of the authentication data therefore necessarily requires the entry of the missing data by the user.

Once the cryptographic block (12) has been activated, the latter acts with the processor (P) of the security device (1) in physical separation from the media for storage of the codes (msc) and data (msd) and can make these visible (or not) to the computer system. Access to these media cannot be effected directly by the computer system but always and necessarily through the cryptographic component (12) and only after authentication.

The field of application of the component (1) concerns any information system in which any processor accesses any external memory medium (4) to be protected that contains the code to be executed as well as the data to be manipulated. The invention allows one to have, in a single device, interposed between the processor system (P) and the memory to be protected (MP), all of the security functions that will allow one, before transmitting the information contained in the memory (3) to the processor (P), to check the right of access and the integrity of the code or of the data, as well as to ensure their protection in terms of confidentiality and/or integrity. The device also includes, in addition to the integrity verification function, a function that prevents access by the system to the changed data or codes on detection of a fraudulent or unexpected change to the latter.

Figure 2:
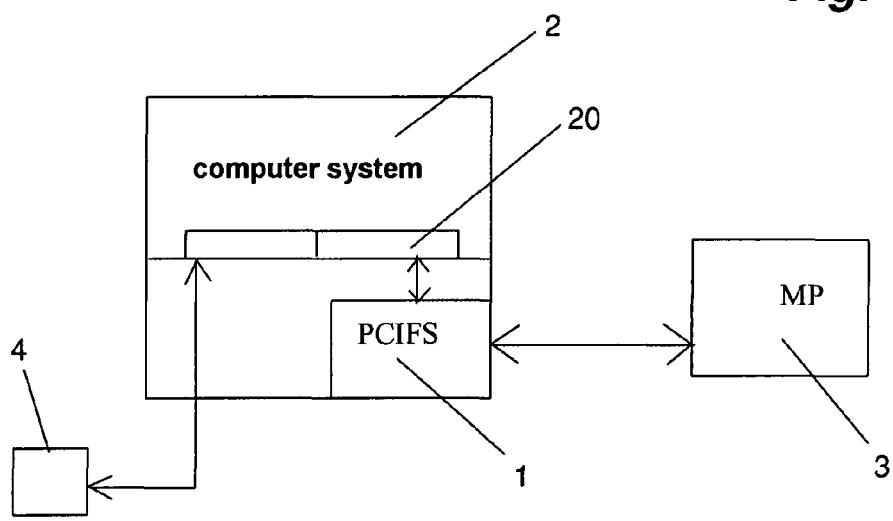
FIG. 2 represents the use of integrated circuit with security function (PCIFS) in a computer system (2) in order to access a protected memory.
Figure 3:
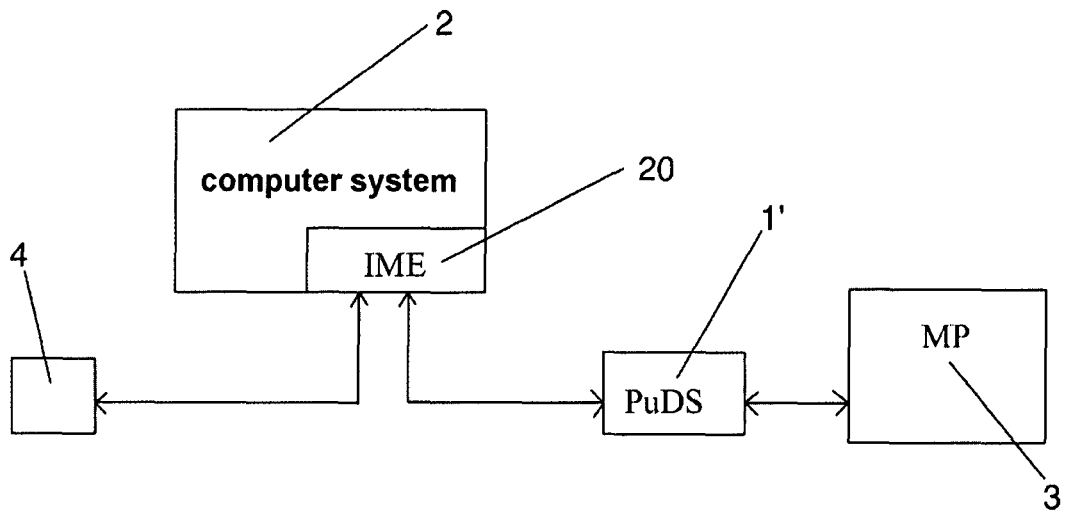
FIG. 3 represents the use of a security chip (PuDS) according to the invention in an assembly that includes a computer system (2) accessing a memory (3) whose data we wish to protect.
Figure 4:
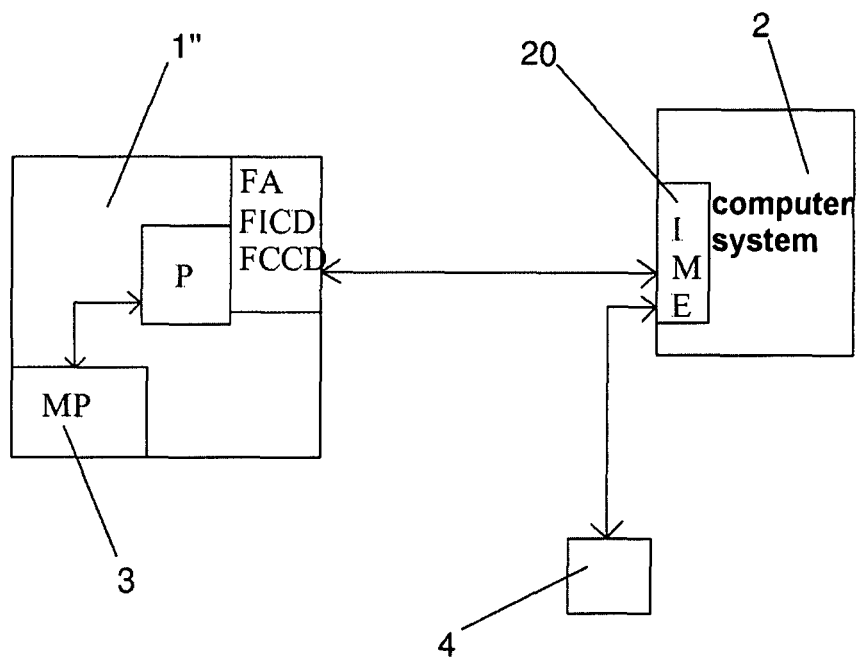
FIG. 4 represents a security device (DS) incorporating the protected memory (3) in its device and conducting a dialogue with the processor (2) of a computer system.

Depending on the technology used, and the level of integration desired for the component or the part component, that is for the part integrated circuit with security functions (PCIFS), the security chip (PuDS), or the security device (DS), forming the device can be implemented:

1. As a VHDL IP block ('Intellectual Property Block') (1) built into a Specific application Integrated Circuit (ASIC) or a Field Programmable Gate Array (FPGA) between the access interface to the protected memory MP (3) and the external memory bus (20) of the ASIC or of the FPGA as shown in FIG. 2.
2. As a separate (1') ASIC or FPGA component located between the protected memory (MP) (3) and the external memory bus (20) of the processor (2) as shown in FIG. 3.
3. As an external and removable device (1") incorporating the security device and the protected memory (MP) (3) located on an external memory interface (20) of the processor system (2) as shown in FIG. 4.

It should be obvious to those skilled in the art that this present invention covers embodiments in many other specific forms while still remaining within the area of application of the invention as claimed. As a consequence, the present methods of implementation should be considered as being provided by way of an illustration, but can be modified within the area determined by the extent of the attached claims, and the invention should not be limited to the details provided above.

What is claimed is:

1. A device for protection of data and executable codes of a fixed or portable computer system with a memory medium to be protected, the device comprising:
    a security and protection device located physically between the computer system and the memory medium to be protected and configured to allow the computer system access to the data and codes to be protected after execution of protection functions;
    the security and protection device configured to execute the protection functions prior to allowing the computer system access to the data and codes;
    the security and protection device configured to execute the protection functions independently of a machine code executed by the computer system; and
    the security and protection device configured to execute the protection functions without requiring interaction with a processor of the system,
    wherein the device has two operating modes that are independent and not simultaneous, the two operating modes including an administrator mode and a user mode, and
    wherein authentication of an administrator is effected by the device itself by means of interface resources between the administrator and the device which are invisible to the computer system.

2. The device according to claim 1, wherein the protection functions include authorization to access the data and codes to be protected, integrity of the data and codes to be protected, and confidentiality of the data and codes to be protected.

3. The device according to claim 1, wherein the data and codes are stored on one of a fixed medium and a removable medium.

4. The device according to claim 1, wherein the memory medium is logically partitioned into a plurality of independent partitions.

5. The device according to claim 1, wherein an operating system of the device runs a process for activation of the device during its connection to the system or when it is switched on.

6. The device according to claim 5, wherein the activation process necessitates authentication of a user or an administrator.

7. The device according to claim 1, wherein an operating system of the device implements protection functions independently of the machine code executed by the computer system.

8. The device according to claim 7, wherein the protection functions are independent of those of the protected computer system and require no interaction with the protected computer system.

9. The device according to claim 1, wherein interfaces with the memory medium and the system are of a parallel type or of the serial type or of a wireless type.

10. The device according to claim 1, wherein the user mode exclusively allows access to the data and codes.

11. The device according to claim 1, wherein the administrator mode exclusively allows configuration and management of the device.

12. The device according to claim 6, wherein the authentication of the user is effected by the operating system of the device itself using resources that are invisible to the computer system.

13. The device according to claim 6, wherein authentication data are either generated entirely by the device or are generated partly by the device and partly by the user or the administrator.

14. The device according to claim 13, wherein the authentication data are unique to each device.

15. The device according to claim 13, wherein the authentication data are not all stored in the device when it is switched on.

16. The device according to claim 6, wherein the authentication of the user is followed by selection, by the user, of a partition or partitions accessed by the computer system.

17. The device according to claim 4, wherein accessible partitions are configured in number, size and method by an administrator, and on which checks are performed by cryptographic mechanisms executed by the device, independently of the computer system.

18. The device according to claim 17, wherein a right of a user to change the configuration of the partitions is configured by the administrator.

19. The device according to claim 18, wherein access to authorized partitions is effected by a security operating system and a processor of the security and protection device, independently of the computer system.

20. The device according to claim 3, wherein the memory to be protected, constituting a storage system, is formatted to suit an operating system of the computer system while being impossible to operate until after prior authentication of a user by the device.

21. The device according to claim 19, wherein the authorized partitions contain a type of code that is executable by the computer system and a type of data in the form of a file system.

22. The device according to claim 18, wherein generation of integrity patterns and checks on the integrity of the codes read or written by the computer system is effected by the device, independently of the computer system.

23. The device according to claim 19, wherein generation of integrity patterns and checks on the integrity of the data read or written by the computer system is effected by the device, independently of the computer system.

24. The device according to claim 18, wherein managing integrity of the data includes implementation by the device of cryptographic mechanisms between the memory medium to be protected and the computer system.

25. The device according to claim 19, wherein managing integrity of the codes includes implementation by the device of cryptographic mechanisms between the memory medium to be protected and the computer system.

26. The device according to claim 18, wherein a detection by the device of a fraudulent or unexpected change to the data or the codes, prevents access by the system to the changed data or codes.

27. The device according to claim 18, wherein protection of confidentiality of the data or the codes read or written by the system is effected by the device, independently of the computer system.

28. The device according to claim 18, wherein managing confidentiality of the data or the codes includes execution of a cryptographic encryption mechanism.

29. The device according to claim 28, wherein no cryptographic key used is stored in clear in a memory of the computer system.

30. The device according to claim 28, wherein no cryptographic key is transmitted in clear on an external bus of the system incorporating the device.

31. The device according to claim 18, wherein the device includes an operating system having means for secure transmission, in terms of integrity and/or confidentiality, from a central system, of a secured update of code executed on target systems or of data manipulated on the target systems.

* * * * *